`US011994191B2`

United States Patent
Weis et al.

(10) Patent No.: US 11,994,191 B2
(45) Date of Patent: May 28, 2024

(54) PLANETARY ROLLER SCREW

(71) Applicant: Schaeffler Technologies AG & Co. KG, Herzogenaurach (DE)

(72) Inventors: Sebastian Weis, Brücken (DE); Waldemar Heier, Homburg (DE); Peter Keller, Bruchmühlbach-Miesau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 124 days.

(21) Appl. No.: 17/798,196

(22) PCT Filed: Feb. 1, 2021

(86) PCT No.: PCT/DE2021/100089
§ 371 (c)(1),
(2) Date: Aug. 8, 2022

(87) PCT Pub. No.: WO2021/160211
PCT Pub. Date: Aug. 19, 2021

(65) Prior Publication Data
US 2023/0092826 A1  Mar. 23, 2023

(30) Foreign Application Priority Data
Feb. 11, 2020  (DE) .................. 10 2020 103 422.9

(51) Int. Cl.
*F16H 25/18*  (2006.01)
*F16H 25/20*  (2006.01)
*F16H 25/22*  (2006.01)

(52) U.S. Cl.
CPC ..... *F16H 25/2252* (2013.01); *F16H 25/2006* (2013.01); *F16H 2025/2081* (2013.01);
(Continued)

(58) Field of Classification Search
CPC ............ F16H 25/2252; F16H 25/2006; F16H 2025/2081; F16H 2025/2096; F16H 2025/2257
See application file for complete search history.

(56) References Cited

U.S. PATENT DOCUMENTS 3,214,991 A * 11/1965 Perrin ................ B23Q 5/40
74/424.92
3,226,809 A * 1/1966 Perrin ................ F16H 25/2252
29/90.01
(Continued)

FOREIGN PATENT DOCUMENTS

DE  102011087560 A1  6/2013
DE  102015212333 A1 *  1/2017  ............ F16H 25/22
(Continued)

*Primary Examiner* — Thomas C Diaz

(57) ABSTRACT

The disclosure relates to a planetary roller screw having: a nut arranged on a threaded spindle and divided crosswise to a spindle axis into two nut parts; planetary rollers arranged between the threaded spindle and the nut distributed over the circumference, the planetary rollers intermeshing with the nut parts and with the threaded spindle; a rotatingly driven planetary roller carrier arranged on the threaded spindle, in pockets of which, arranged distributed over the circumference, the planetary rollers are mounted, held at a distance in the circumferential direction, so as to be rotatable about the planetary roller axis; and a housing in which the planetary roller carrier is rotatably mounted. A pre-loading device is provided in order to adjust an axial pre-load between the housing and the planetary rollers.

16 Claims, 2 Drawing Sheets

(52) U.S. Cl.
CPC ............... *F16H 2025/2096* (2013.01); *F16H 2025/2257* (2013.01)

(56) References Cited

U.S. PATENT DOCUMENTS

| | | | | |
|---|---|---|---|---|
| 4,872,795 | A | * 10/1989 | Davis | F16H 25/2006 411/432 |
| 2021/0269085 | A1 | * 9/2021 | Wuebbolt-Gorbatenko | F16H 25/2006 |

FOREIGN PATENT DOCUMENTS

| | | |
|---|---|---|
| DE | 102017124386 A1 | 1/2019 |
| DE | 102018116867 A1 | 1/2020 |
| DE | 102019112480 B3 | 2/2020 |
| DE | 102019103383 A1 | 8/2020 |
| DE | 102019103384 A1 | 8/2020 |
| DE | 102019103385 A1 | 8/2020 |
| DE | 102019126875 A1 | 4/2021 |

\* cited by examiner

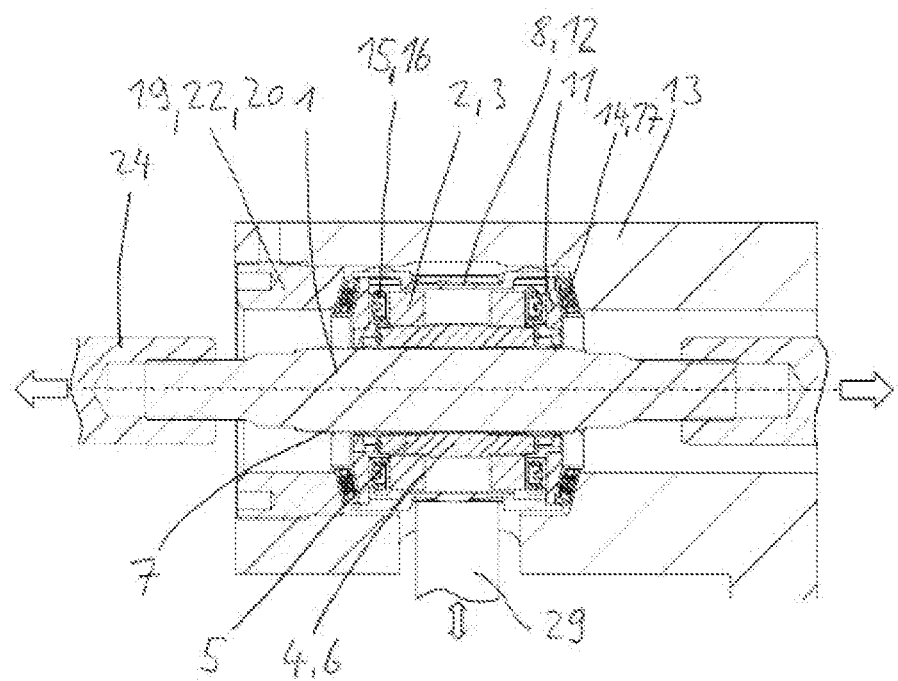
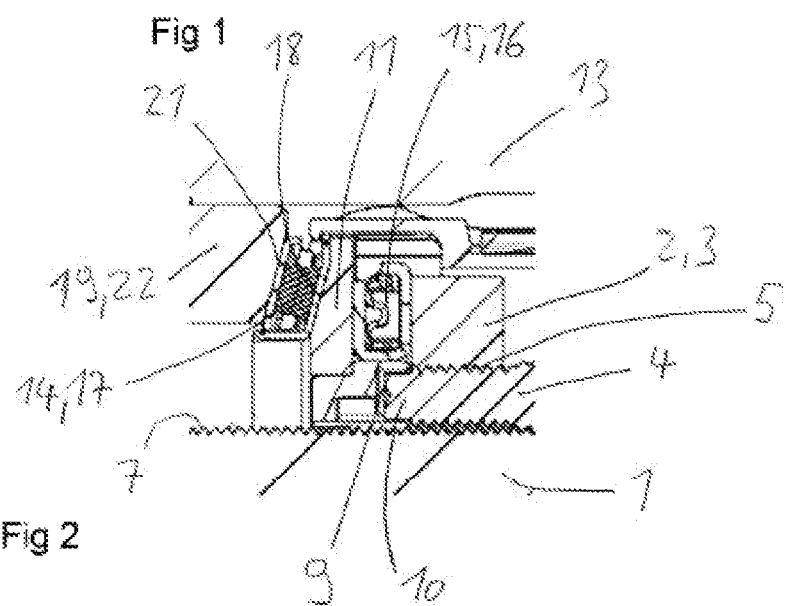
Fig 1
Fig 2

PLANETARY ROLLER SCREW

CROSS-REFERENCE TO RELATED APPLICATIONS

This application is the U.S. National Phase of PCT Application No. PCT/DE2021/100089 filed on Feb. 1, 2021, which claims priority to DE 10 2020 103 422.9 filed on Feb. 11, 2020, the entire disclosures of which are incorporated by reference herein.

TECHNICAL FIELD

The present disclosure relates to a planetary roller screw that converts rotational movement into translational movement. The disclosure also relates to an actuator of a front-axle steering system as well as a rear-axle steering system of a motor vehicle, with such a planetary roller screw.

BACKGROUND

A planetary roller screw has been made known from DE 10 2018 116 867 A1. This planetary roller screw is provided with a nut arranged on a threaded spindle, which is divided crosswise to the spindle axis into two nut parts, and with planetary rollers arranged between the threaded spindle and the nut, which intermesh with their planet-side groove profile on the one hand with a groove profile on the nut side and on the other hand with a thread profile of the threaded spindle. This planetary roller screw also has a planetary roller carrier, in the pockets of which, arranged distributed over the circumference, the planetary rollers are rotatably mounted about their planetary roller axis.

The planetary roller carrier engages around the nut, the nut parts of which are pre-loaded by means of various technical measures to allow freedom from play in engagement with the planetary rollers. This publication proposes installing a spacer between the nut parts. It is also proposed as an alternative to insert the nut parts in two screw sleeves on which the nut parts are axially supported and which are screwed together until the aforementioned freedom from play is achieved.

These measures are complex and require corresponding installation space within the planetary roller carrier. In automotive applications in particular, however, there is a regular need for cost-effective, space-saving planetary roller screws, especially when they are used in actuators of a rear-axle steering system or a front-axle steering system.

SUMMARY

The present disclosure is based on the object of providing a planetary roller screw which is easy to manufacture and which requires less installation space.

This object is achieved by the planetary roller screw described herein.

The planetary roller screw is provided with a nut arranged on a threaded spindle, which is axially divided into two nut parts crosswise to the spindle axis. The two nut parts are arranged axially one behind the other. An axial distance between the two nut parts is adjusted in accordance with the shape of the planetary rollers with which the nut parts intermesh. The two nut parts do not need to be connected to each other by further components, except for the planetary rollers that intermesh with the nut parts. These nut parts can have sleeve-like extensions facing one another that are coaxial with the nut parts and interlock with little radial play, i.e., overlap one another other axially. In this case, these interlocking extensions are dimensioned such that the nut parts are radially aligned with one another and have a defined radial play or defined fit with one another.

Planetary rollers are arranged between the threaded spindle and the nut, distributed over the circumference, which intermesh with the nut parts on the one hand and with the threaded spindle on the other. The planetary rollers can each have a center groove profile that intermeshes with a thread profile of the threaded spindle, and each have outer groove profiles located on either side of the center groove profile, one outer groove profile of which intermeshes with one nut part and the other outer groove profile of which intermeshes with the other nut part. The center groove profile is larger in diameter than the adjacent outer groove profiles.

Furthermore, a rotatingly driven planetary roller carrier is provided on the threaded spindle, in pockets of which, arranged distributed over the circumference, the planets are held at a distance in the circumferential direction and rotatably mounted about their planetary roller axis. The planetary roller carrier can be part of a belt pulley around which a toothed belt of a belt drive is wound. The toothed belt can be driven by an electric motor. Under the rotary drive, the planetary carrier rotates around the threaded spindle and the planets roll off the threaded spindle and nut and rotate around their longitudinal axis in the pockets of the planetary roller carrier. One complete revolution of the planetary roller carrier is equivalent to a spindle feed corresponding in its amount to the pitch of the thread of the threaded spindle. As a result, this type of planetary roller screw is pitch-true.

The planetary roller carrier can have two carrier flanges arranged to be axially spaced apart from one another and a drive gear or drive sleeve—e.g., a toothed belt pulley—which is arranged to be coaxial to the threaded spindle, engages around the nut and is connected in a non-rotatable manner to the two carrier flanges, wherein the two carrier flanges are arranged to be axially displaceable relative to one another. One of the two carrier flanges can be fixedly connected to the drive gear, the other carrier flange can be connected to the drive gear by means of a sliding fit which allows for axial relative displacements between this carrier flange and the drive gear, and thus relative displacements between the two carrier flanges. The two carrier flanges are provided with the pockets to receive the planets.

The planetary roller screw has a housing in which the mentioned components are installed. The housing can be an actuator housing. If the planetary roller screw is part of an actuator of a rear-axle steering system of a motor vehicle, the housing can be provided with two passthroughs through which a push rod passes, wherein the threaded spindle is part of this push rod. The housing can be an open component with fixed mounting on which the moving components of the planetary roller screw are mounted.

The planetary roller carrier can be supported by means of inner support bearings and outer support bearings. One outer support bearing can be located between one nut part and the housing, and the other outer support bearing can be located between the other nut part and the housing. In this manner, the planetary roller carrier can be rotatably mounted in the housing without any issues, wherein the carrier flanges, which are arranged to be axially displaceable relative to one another, simplify the adjustment of a desired axial bearing play or axial pre-load.

One inner support bearing can be located between one nut part and one carrier flange, and the other inner support bearing can be located between the other nut part and the other carrier flange.

This bearing arrangement is selected such that an axial play of the planetary roller carrier in the housing can be adjusted by means of a pre-loading device up to a desired axial pre-load. In the simplest case, an axial support surface in the housing-side bearing seat for the one outer support bearing can be adjustable such that, under an axial displacement of this axial support surface, the axial play of all components involved can be adjusted between the two outer support bearings up to a desired axial pre-load.

In an example embodiment, the inner support bearings are formed by axial roller bearings. The nut parts can be operated without radial load and only transmit the axial forces introduced via the threaded spindle into the housing via the support bearings.

In an example embodiment, the outer support bearings are formed by angular contact bearings. In this manner, tensile forces transmitted by the toothed belt are transmitted as a radial force into the housing via the angular contact bearing. If an angular contact roller bearing with cylindrical rolling elements is used, the conically shaped raceways of this angular contact bearing can, for example, be arranged at an angle of approximately 15 degrees to a plane arranged transverse to the spindle axis. In this manner, large axial forces can be transmitted on the one hand and radial forces on the other.

In the case of angular contact roller bearings as outer support bearings, it is advantageous if the carrier flanges of the planetary roller carrier are each provided with a conically shaped support surface for the angular contact bearing on their end faces facing away from one another. This one bearing washer of the angular contact roller bearing can lie flat against this support surface or this support surface can serve directly as a raceway for cylindrical or tapered rolling elements of the angular contact roller bearing. The cone angle can be approximately 15 degrees, as already described above.

The pre-loading device is provided in order to adjust an axial pre-load between the housing and the planetary rollers. This axial pre-load is transmitted from the housing via the two nut parts to the planetary rollers. The support bearings optionally arranged on both sides of the carrier flanges in the manner described transmit this axial pre-load. Under this pre-load, the planetary rollers are subjected to compressive loading.

In contrast to known pre-loading devices, no special components are required in the installation space inside the planetary roller carrier to build up this pre-load. It is sufficient to install this pre-loading device between the housing and the planetary roller carrier. In addition to a reduction in required installation space, this means that the mass of the rotating components can be reduced.

In an example embodiment, the pre-loading device can have a screw part, which is screwed into the housing, the end face of which facing the outer support bearing is designed as an axial support surface in the housing-side bearing seat for the one outer support bearing. It is sufficient to provide such a screw part on only one axial side. The other axial support surface on the opposite housing-side bearing seat for the other outer support bearing can be an integral part of the housing. The screw part can be designed as a threaded ring arranged to be coaxial with the threaded spindle, which is screwed into a threaded hole of the housing arranged to be coaxial to the threaded spindle.

As an alternative to a screw part, it can be sufficient to insert a compensating ring into the housing, the end face of which is designed as an axial support surface in the housing-side bearing seat for the one outer support bearing. The thicker the compensating ring, the smaller the axial play of the planetary roller screw.

To adjust a desired axial pre-load or axial play, the pre-loading device is advanced until a corresponding axial play is set between the housing and the planetary rollers. In the case of the screw part, it is advanced towards the one outer support bearing until a desired play or freedom from play is achieved between the housing and the planetary rollers and then secured in this screw position.

The planetary roller screw according to the disclosure is particularly suitable for an actuator of a rear-axle steering system and also of a front-axle steering system of a motor vehicle. This actuator is provided with a push rod whose ends facing away from one another are designed for steering rear wheels of the motor vehicle. In this case, the threaded spindle can be part of the push rod, between the ends of which the threaded spindle is formed. The push rod can have two push rod parts, between which the threaded spindle is arranged and fixedly connected to both push rod parts. The free ends of the push rod facing away from one another extend out of the housing of the actuator and are provided with steering heads that engage the wheel carriers of the rear wheels.

In an example embodiment, this actuator is provided with an electric motor and with a belt drive, the toothed belt of which wraps around a motor pinion of the electric motor as well as the drive sleeve. The belt drive with the motor pinion and the planetary roller screw can be arranged in the actuator housing. The electric motor can be arranged outside the housing.

BRIEF DESCRIPTION OF THE DRAWINGS

The disclosure is explained in more detail below with reference to an exemplary embodiment shown in five figures. In the figures:

FIG. 1 shows a planetary roller screw in a longitudinal section,

FIG. 2 shows an enlarged section of FIG. 1,

DETAILED DESCRIPTION

Figure 3:
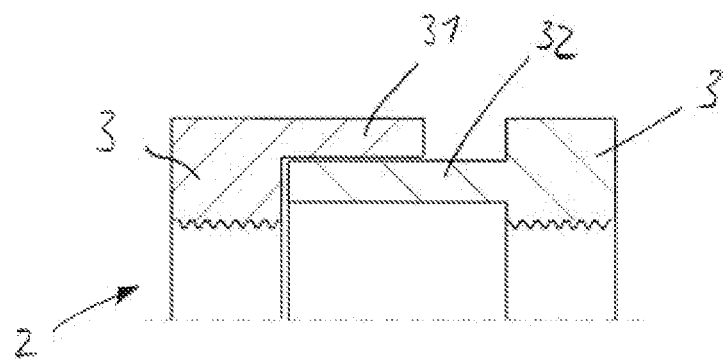
FIG. 3 shows a variant of a nut of the planetary roller screw.

The planetary roller screw shown in FIGS. 1 and 2 is provided with a nut 2 arranged on a threaded spindle 1. The nut 2 is divided into two nut parts 3 arranged to be axially one behind the other. Planetary rollers 4 are distributed over the circumference of the threaded spindle 1 between the threaded spindle 1 and the nut 2. The planetary rollers 4 intermesh with their outer groove profiles 5 with the two nut parts 3 and with their center groove profile 6 with a thread profile 7 of the threaded spindle 1, which is helically wound around the spindle axis. The center groove profile 6 is larger in diameter than the adjacent outer groove profiles 5. The threaded spindle 1 is part of a push rod 24. Both axial ends of the threaded spindle are fixedly connected—in a releasable or non-releasable manner—to push rod parts.

The planetary roller screw also has a planetary roller carrier 8, in the pockets 9 of which, arranged distributed over the circumference, the planetary rollers 4 are rotatably mounted about their planetary roller axis. FIG. 2 clearly shows bearing journals 10 which are formed at the axial ends of the planetary rollers 4, which engage in the pockets 9 of the planetary roller carrier 8.

The planetary roller carrier 8 has two carrier flanges 11 arranged axially spaced apart from one another and a drive gear 12, which is arranged to be coaxial to the threaded spindle 1, engages around the nut 2 and is connected in a non-rotatable manner to the two carrier flanges 11. The two carrier flanges 11 are arranged to be axially movable relative to one another. Both carrier flanges 11 are non-rotatable but axially displaceable by means of a sliding fit with the drive gear 12. The two carrier flanges 11 are provided with the pockets 9 for receiving the planetary rollers 4.

The planetary roller screw has a housing 13 in which the planetary roller carrier 8 is rotatably mounted by means of outer support bearings 14. Both nut parts 3 are rotatably mounted on their sides facing the respective carrier flange 11 by means of inner support bearings 15. The inner support bearings 15 are formed by axial roller bearings 16. The outer support bearings 14 are formed by angular contact bearings 17.

The carrier flanges 11 are each provided with a conically shaped support surface 18 for the cylindrical rolling elements of the angular contact bearing 17 on their end faces facing away from one another. The carrier flanges are designed to be flat at their facing end faces to support the axial roller bearings 16.

Furthermore, a pre-loading device 19 is provided in order to adjust an axial pre-load between the housing 13 and the planetary rollers 4. The pre-loading device has a screw part 20 which is screwed into the housing 13, the end face of which facing the angular contact bearing 17 is designed as a housing-side bearing seat 21 of one of the outer support bearings. The screw part 20 is designed as a threaded ring 22 arranged coaxially with the threaded spindle 1, which is screwed into a threaded hole 23 of the housing 13.

In order to remove the bearing play from the described bearing arrangement, the threaded ring 22 is axially advanced in the direction of the adjacent angular contact bearing 17 by a screwing movement. Under this axial advancing movement, the carrier flange 11 shown on the left in FIG. 1 is pressed to the right and removes the axial bearing play from the axial roller bearing 16. Consequently, under the engagement of the two nut parts 3 with the planetary rollers 4, the nut part 3 shown on the right in FIG. 1 is moved to the right in the direction of the axial roller bearing 16 as well as the angular contact bearing 17 until finally the axial bearing play is also removed from these bearings. The force flow described here runs from left to right, seen from the threaded ring 22 via the angular contact bearing 17, the carrier flange 11, the axial roller bearing 16, the nut part 3, the planetary rollers 4, and from there via the other nut part 3 via the other axial roller bearing 16, the other carrier flange 11, the other angular contact bearing 17 finally into the housing 13.

FIG. 3 shows a variant of the nut 2 with sleeve-shaped projections 31, 32, which are provided on facing end faces of the two nut parts 3 and which interlock and axially overlap one another. These extensions are arranged coaxially with the nut 2, but have different diameters that are matched to one another for fitting; the nut parts are perfectly radially aligned with one another in this way. Consequently, there is only a small radial play between the extensions 31, 32.

Figure 4:
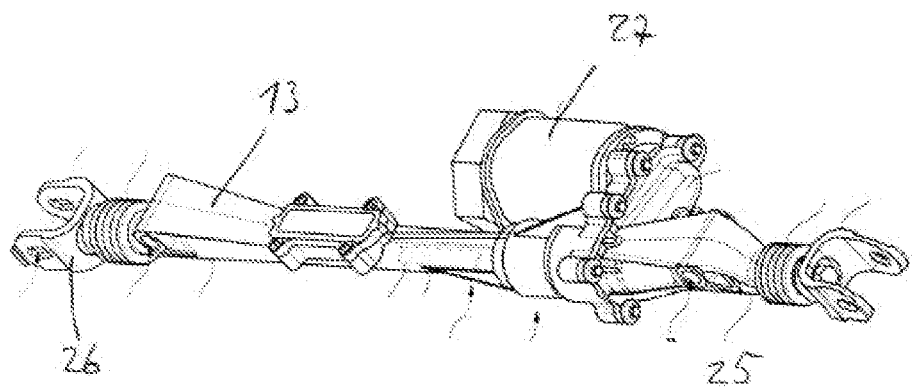
FIG. 4 shows an actuator of a rear-axle steering system of a motor vehicle.
Figure 5:
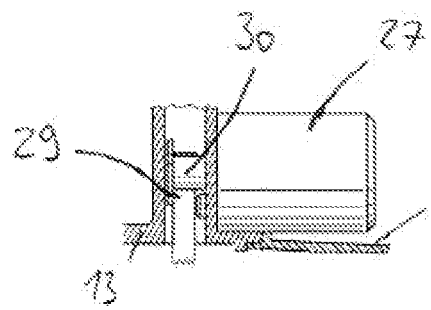
FIG. 5 shows a section of the actuator of FIG. 4.

FIGS. 4 and 5 show an actuator of a rear-axle steering system of a motor vehicle, with the planetary roller screw described above. The housing 13 has housing openings 25 on the left and right, through which the push rod 24 is passed on both sides. In FIG. 4, the push rod is concealed outside the housing 13 by bellows. At its ends, the push rod 24 is provided with steering heads 26 to which wheel control arms, which are not shown further, are connected.

During operation of the actuator, the planetary roller screw adjusted so as to be free of play ensures a reverse movement of the push rod 24 when the direction of rotation of the planetary roller carrier is reversed, without any axial play being reduced during this reverse movement. Under the force of the pre-load, all bearing components involved are adjusted to such an extent that the planetary rollers 4 are pressed into contact with the nut parts 3.

The actuator has an electric motor 27 and a belt drive 28. A toothed belt 29 wraps around a motor pinion 30 of the electric motor 27 and the drive gear 12, which is not shown here.

LIST OF REFERENCE SYMBOLS

1 Threaded spindle
2 Nut
3 Nut parts
4 Planetary roller
5 Outer groove profiles
6 Center groove profile
7 Thread profile
8 Planetary roller carrier
9 Pocket
10 Bearing journal
11 Carrier flange
12 Drive gear
13 Housing
14 Outer support bearing
15 Inner support bearing
16 Axial roller bearing
17 Angular contact bearing
18 Raceway
19 Pre-loading device
20 Screw part
21 Housing-side bearing seat
22 Threaded ring
23 Threaded hole
24 Push rod
25 Housing opening
26 Steering head
27 Electric motor
28 Belt drive
29 Toothed belt
30 Motor pinion
31 Sleeve-like extension
32 Sleeve-like extension

The invention claimed is:

1. A planetary roller screw, comprising;
   a nut arranged on a threaded spindle, the nut including two nut parts,
   planetary rollers arranged between the threaded spindle and the nut, the planetary rollers distributed around the circumference of the threaded spindle such that the planetary rollers intermesh with the two nut parts and with the threaded spindle,
   a rotatingly driven planetary roller carrier arranged around the threaded spindle, the planetary roller carrier having pockets arranged around the circumference of the planetary roller carrier, the pockets configured to mountably receive the planetary rollers, the planetary roller carrier further comprises two carrier flanges arranged to be axially spaced apart from one another, and the two carrier flanges are arranged to be axially displaceable relative to each other and include the pockets configured for receiving the planetary rollers, and a housing configured to rotatably to rotatably receive the planetary roller carrier, and a pre-loading device configured to adjust an axial pre-load or an axial play between the housing and the planetary rollers.

2. The planetary roller screw according to claim 1, wherein each of the planetary rollers have a center groove profile configured to intermesh with a thread profile of the threaded spindle, and each of the planetary rollers have outer groove profiles arranged on each side of the center groove profile, and one of the outer groove profiles intermeshes with one of the two nut parts, and another one of the outer groove profiles intermeshes with a remaining one of the two nut part.

3. The planetary roller screw of claim 1, wherein the planetary roller carrier is supported via inner support bearings and outer support bearings, and one of the outer support bearings is arranged between one of the two nut parts and the housing, and another one of the outer support bearings is arranged between a remaining one of the two nut parts and the housing, and another one of the inner support bearing is arranged between the remaining one of the two nut parts and the other carrier flange.

4. The planetary roller screw of claim 3, wherein the inner support bearings are axial roller bearings, and the outer support bearings are angular contact bearings.

5. The planetary roller screw of claim 1, wherein the carrier flanges are each configured with a conically shaped support surface.

6. The planetary roller screw of claim 4, wherein the pre-loading device has a screw part screwed to the housing, and an end face of the screw part facing the angular contact bearing is configured as a housing-side bearing seat of one of the outer support bearings.

7. The planetary roller screw according claim 6, wherein the screw part is configured as a threaded ring arranged coaxially with the threaded spindle and screwed into a threaded hole of the housing.

8. An actuator of a rear-axle steering system of a motor vehicle, the actuator having:
the planetary roller screw of claim 1,
a longitudinally displaceable push rod configured with steering heads, the push rod engaging through housing openings of the housing, and the threaded spindle fixed to the push rod.

9. A method of adjusting a pre-load of a planetary roller screw according to claim 1, the method comprising:
inserting the planetary roller screw into the housing, and
adjusting the pre-loading device until the axial pre-load or the axial play is set between the housing and the planetary rollers.

10. A planetary roller screw configured to be received by a housing, the planetary roller screw comprising:

a nut arranged on a threaded spindle, the nut including a first nut part and a second nut part, planetary rollers arranged radially between the threaded spindle and the nut, the planetary rollers intermeshing with the first and second nut parts and with the threaded spindle, a rotatingly driven planetary roller carrier arranged around the threaded spindle, the planetary roller carrier having circumferentially arranged pockets configured to mountably receive the planetary rollers, a pre-loading device configured to adjust an axial pre-load or axial play between the planetary rollers and the housing, and wherein the pre-loading device is a threaded ring configured to be screwed into a threaded hole of the housing, the threaded ring is arranged coaxially with the threaded spindle, and the threaded ring has a conically shaped end face configured to move axially toward the planetary rollers to adjust the axial pre-load or the axial play.

11. The planetary roller screw of claim 10, wherein the planetary roller carrier further comprises two carrier flanges arranged to be axially spaced apart from one another, and at least one of the two carrier flanges includes a conically shaped support surface.

12. The planetary roller screw of claim 11, further comprising an angular contact bearing arranged between the conically shaped end face and the conically shaped support surface.

13. The planetary roller screw of claim 10, wherein the first nut part includes a first sleeve-shaped projection and the second nut part includes a second sleeve-shaped projection, and the first sleeve-shaped projection axially overlaps with the second sleeve-shaped projection.

14. The planetary roller screw of claim 13, wherein when the axial pre-load or the axial play is adjusted the first nut part moves closer to the second nut part.

15. The planetary roller screw of claim 13, wherein the first sleeve-shaped projection is: i) arranged coaxially to the second sleeve-shaped projection, and ii) disposed at least partially within the second sleeve-shaped projection.

16. The planetary roller screw of claim 13, wherein the first sleeve-shaped projection forms a radial gap with the second sleeve-shaped projection.

* * * * *